United States Patent [19]

Block

[11] 4,086,146
[45] Apr. 25, 1978

[54] WATER TREATING PROCESS

[75] Inventor: Jacob Block, Rockville, Md.

[73] Assignee: W. R. Grace & Co., New York, N.Y.

[21] Appl. No.: 774,097

[22] Filed: Mar. 3, 1977

Related U.S. Application Data

[63] Continuation-in-part of Ser. No. 631,344, Nov. 12, 1975, abandoned.

[51] Int. Cl.² .................. C23F 11/10; B01D 3/34
[52] U.S. Cl. .................... 203/7; 21/2.7 R; 252/180
[58] Field of Search .............. 203/7, 10, 11, DIG. 17; 210/58; 21/2.7 R; 252/180, 181

[56] References Cited

U.S. PATENT DOCUMENTS

| | | | |
|---|---|---|---|
| 3,260,668 | 7/1966 | McIlhenny | 203/7 |
| 3,289,734 | 12/1966 | Robertson | 159/47 |
| 3,514,376 | 5/1970 | Salvtsky | 203/7 |
| 3,617,557 | 11/1971 | Giltrow | 210/31 |
| 3,650,970 | 3/1972 | Pratt et al. | 252/181 |
| 3,715,307 | 2/1973 | Johnson et al. | 210/58 |
| 3,775,264 | 11/1973 | Bharucha | 204/28 |
| 3,850,832 | 11/1974 | Wegemund et al. | 252/99 |

FOREIGN PATENT DOCUMENTS

| | | | |
|---|---|---|---|
| 1,414,918 | 11/1975 | United Kingdom | 210/58 |

*Primary Examiner*—Hiram H. Bernstein
*Attorney, Agent, or Firm*—Charles L. Harness

[57] ABSTRACT

A method of inhibiting the deposition of scale on the heat exchange surfaces of evaporators by adding 0.1 to 15 part per million quantities of maleic-furan copolymers or salts thereof to the evaporators.

3 Claims, No Drawings

WATER TREATING PROCESS

This is a continuation-in-part of my copending application Ser. No. 631,344, filed Nov. 12, 1975, now abandoned.

BACKGROUND OF THE INVENTION

Maleic anhydride copolymers have been previously investigated as scale inhibiting agents in feed waters of various types of heat exchangers. U.S. Pat. No. 3,650,970 discloses the use of alkali metal or ammonium salts of a polymer formed by esterifying styrene-maleic anhydride copolymers with capped polyethylene glycol as calcium sulfate scale inhibitors. U.S. Pat. No. 3,715,307 to Johnson et al discloses the use of maleic anhydride vinyl acetate copolymers to reduce maintenance problems associated with the use of water and heat transfer equipment. U.S. Pat. Nos. 3,723,956, 3,617,557, 3,289,734, and 3,775,264 disclose the use of other copolymers as scale inhibitors in various types of heat exchangers.

The copolymers of maleic anhydride and furan covered in the instant application are described in the "Journal of Macromolecular Science-Chemistry", Vol. A4 (1), pages 52 to 54.

These copolymers are described in U.S. Pat. No. 3,850,832 for use as sequestering agents in washing, rinsing and cleaning compositions.

BRIEF DESCRIPTION OF THE INVENTION

I have found that copolymers of maleic anhydride and furan have good scale inhibiting properties especially for calcium carbonate and magnesium hydroxide scales. The maleic anhydride copolymers can be copolymers of either maleic anhydride or maleic acid. The range of copolymerization can be 40% maleic to 60% maleic with the preferred ratio being 50% maleic-50% furan. The weight ratio of maleic anhydride to to furan in the reactant solution is 0.67 to 1.5; molecular weight range is 500 to 50,000 with 500 to 20,000 being preferred.

DETAILED DESCRIPTION OF THE INVENTION

The maleic anhydride copolymers of my invention can be copolymers of either maleic anhydride or maleic acid with furan. The copolymers are described in the "Journal of Macromolecular Science-Chemistry", reference referred to above. The preferred copolymers can be prepared by copolymerization of about equal molar amounts of furan and maleic anhydride or by polymerization of the Diels-Alder adduct of furan and maleic anhydride, for example, by reaction in a benzene solution with azobisisobutyronitrile as a catalyst. the polymers thus obtained are converted into their salts by saponification with inorganic or organic bases.

These polymers have been disclosed as sequestering agents in washing, rinsing, and cleaning compositions. However, the mechanisms in sequestering and scale inhibition are substantially different. The quantities of copolymer used in scale inhibition are substochiometric. The sequestering properties of these compounds are not important in this invention. There are many cases of well known sequestering agents such as ethylenediamine tetra-acetic acid (EDTA), nitrilotetra-acetic acid (NTA), for example, which have no threshold properties.

The preferred molecular weight of the copolymers of this invention is between 500 and 20,000. The copolymer is added in concentrations of from 0.1 to 15 parts per million with one to ten parts per million being preferred. If used in a seawater distillation plant, the copolymer scale inhibiting composition is added after first preparing a solution or dispersion of the copolymer generally containing 5 to 10% by weight of the copolymer in water. Either seawater or distilled water may be used to prepare the dispersion or solution. The solution or dispersion is then fed into the plant by pumping it into the brine recycle. Alternatively, the solution or dispersion may be added to the seawater feed. The copolymer may also be fed into the plant using the plant vacuum.

Although our invention has been described in reference to seawater distillation plants it also gives satisfactory results in cooling systems, black liquor evaporators, waste concentrators, and similar equipment.

Our invention is illustrated by the following specific but non-limiting examples.

EXAMPLE 1

This example illustrates the test procedure used to determine the calcium carbonate ($CaCO_3$) and magnesium hydroxide ($Mg(OH)_2$) inhibiting properties of the copolymer of our invention.

One liter tall form beakers are used in the test. A total of 700 ml. of seawater and the additive to be tested, if any, are added to these beakers. A Monel coupon is added to each beaker to provide a metal surface to induce precipitation. The beakers are placed inside a specially designed pressure vessel containing 4.5 l of lithium chloride solution prepared to contain 1000 g. of lithium chloride and 5.5 l of solution. The lithium chloride solution provides a constant temperature bath about 8° to 10° hotter than the seawater in the beakers. The beakers are heated in the pressure vessel at a pressure of 10 p.s.i. for predetermined periods of time, usually about 35 minutes. The vessels are then cooled to reduce the pressure to atmospheric and the beakers are removed. The volume of remaining seawater is determined, the seawater is filtered on a 0.45 micron cellulose ester filter to remove any precipitated solids. The solids are dissolved in dilute sulfuric acid and brought to volume in a volumetric flask. The calcium and magnesium content of each flask is determined by titration with ethylenediamine tetra-acetic acid and the chloride content is determined by titration with silver nitrate. Calcium and magnesium values are corrected for any calcium or magnesium which would be associated with the chloride in the seawater. The results are expressed in milligrams as calcium carbonate precipitated even though the magnesium is actually precipitated as magnesium hydroxide.

EXAMPLE 2

This example illustrates a typical method of preparing the maleic anhydride-furan copolymer. This method is described in the "Journal of Macromolecular Science-Chemistry" Vol. A4 (1), pages 52 to 54. In the description of the method of preparation the authors state: "Copolymerization of furan and maleic anhydride, in benzene solution, was effected using 2,2'-azobisisobutyronitrile (AIBN) as a free radical initiator." The reactions were accomplished in sealed tubes, under nitrogen atmosphere at preselected temperatures and initiator concentrations. Detailed studies were completed to determine optimum conditions for copolymerization. The polymer precipitated and was isolated by filtration and washed with anhydrous ethyl ether and benzene.

In one series of experiments the polymerization was allowed to proceed to a very low yield (< 5%) under the following conditions: reaction temperatures 70° C.; AIBN, 3% of total monomer weight; reaction time, 18-25 min. The authors further state under the heading "Polymerization of Furan-Maleic Anhydride Adduct (Exo-cis-3,6-endoxo-4-tetrahydrophthalic anhydride.)", the previously discussed copolymerization of crystalline material was observed when the reaction was accomplished at low temperatures or when the catalyst concentration was below 1%. The product had, in all cases, a melting point of 105° C. The crystalline product was identified as the Diels-Alder adduct of the comonomer pair.

The pure adduct was polymerized using 3% AIBN initiator at 70° C. in tetrahydrofuran and benzene according to the method described above. In both cases the product was a white powder. Vapor phase osmometry molecular weight determination revealed a number average molecular weight of approximately 600 for the tetrahydrofuran reaction and approximately 2800 for the benzene reaction.

The product was converted to the sodium salt using the following techniques:

A total of 230 gm. of a polymer produced by polymerization of 1,2,3,6-tetrahydro-3,6-epoxy-phthalic acid anhydride were suspended in an eight-fold amount of water and stirred at 70° C. for about 1 hour until a clear solution was obtained. The pH of the solution was adjusted to 8 to 9 with a 20 percent aqueous solution of sodium hydroxide, filtered and the filtrate was evaporated to dryness.

EXAMPLE 3

The effectiveness of the copolymer of our invention in inhibiting calcium carbonate and magnesium hydroxide scale deposition was determined at 115° C. using a maleic anhydride-furan copolymer having a molecular weight of about 1000 obtained from the German firm of Henkel and Cie and the method described in Example 1. The data collected is presented in the table below.

TABLE I

| Dosage (ppm) | Final Seawater Concentration | Ca Precipitated (as mg CaCO$_3$) | Mg Precipitated (as mg CaCO$_3$) |
|---|---|---|---|
| 0 | 1.10 | 8.6 | 58.6 |
| 6 | 1.10 | 0.2 | 27.8 |
| 6 | 1.11 | 0.4 | 24.8 |
| 6 | 1.11 | 0.6 | 16.6 |

It is apparent from a review of these data that a very substantial reduction in precipitated calcium and magnesium is achieved by adding as little as 6 parts per million of the copolymer to the feed to the seawater distillation plant. The amount of calcium carbonate precipitated decreased from 8.6 milligrams to less than 1 milligram and amount of magnesium precipitated decreased by a factor of more than 2.

EXAMPLE 4

The effectiveness of another of the copolymers having a molecular weight of 3000 and obtained from the German firm of Henkel and Cie was tested using the method described in Example 1. The test was carried out at a temperature of 115° C.

TABLE II

| Dosage (ppm) | Final Seawater Concentration | Ca Precipitated (as mg CaCO$_3$) | Mg Precipitated (as mg CaCO$_3$) |
|---|---|---|---|
| 0 | 1.10 | 8.6 | 58.6 |
| 6 | 1.11 | 0.2 | 22.6 |

It is apparent from a review of these data that the results obtained on my copolymer having a molecular weight of 1000 are comparable to those having a molecular weight of 3000.

MODIFICATIONS AND ADDITIONS

Although the above embodiments employ the copolymers of this invention alone as scale inhibiting compounds, actually a large number of compatible ingredients can be added in physical admixture with the copolymer and/or separately into the evaporator system. These additives are well known to those skilled in the art, and the following are listed simply as typical, and not by way of limitation. General classes of materials can be added, such as antifoams, other scale inhibitors, chelating agents and so on. The antifoam may include materials such as polyethylene glycol (PEG) fatty acid esters, block copolymers of ethylene oxide and propylene oxides, PEG ethers of alkylphenols, and PEG ethers of long chain alcohols. Other compatible scale inhibitors include polymethacrylic acid and its salts; polyacrylic acid and its salts; organophosphonates, such as hydroxyethylidine-1,1 diphosphonic acid and its salts, and the aminomethylenephosphonates; organic phosphate esters; polymaleic anhydride; and polymaleic acid and its salts. Suitable chelating agents include ethylendiamine tetra-acetic acid and its salts, nitrilotriacetic acid and its salts, etc.

EXAMPLE 5

This example is based on my experience with the products of this invention, but has not actually been tried. However, it is my information and belief that the composition and method given below is operable as stated.

The composition chosen is as follows:

| | |
|---|---|
| Scale inhibitor | 4 parts maleic-furan copolymer |
| | 2 parts polymethacrylic acid - sodium salt |
| Antifoam | 1 part polyethyleneglycol 400 monolaurate |
| Chelating agent | 1 part EDTA |

This is believed suitable for us, for example, in any conventional type of sea water evaporator system, e.g., a one million gallon per day multi-stage flash evaporator. This formulation may conveniently be added to the brine recycle stream, or to the sea water makeup system, or any other conventional inlet.

As already explained above, the effect of these scale inhibiting compositions of this invention occurs in helping to maintain the surfaces of the heat exchangers scale-free. Thus in a typical sea water evaporator system, the surfaces of the heat exchangers would be kept relatively free of scale by the use of these compounds in the manner prescribed. Generally these heat exchangers are in the form of tube bundles, with the sea water (as brine or the like) circulating through the tubes, and the tubes being heated on the outside by steam or the like.

What is claimed is:

1. A process for inhibiting the deposition of scale onto the heat exchange surfaces in a seawater distillation plant which comprises adding to the liquid in the plant a composition consisting essentially of a copolymer of a member of the group consisting of maleic anhydride and maleic acid and a member of the group consisting of furan and salts thereof, the ratio of maleic component to furan in the reactant solution being 0.67 to 1.5; and the copolymer being present in a concentration of 0.1 to 15 parts per million.

2. The process according to claim 1 wherein the copolymer has a molecular weight of 500 to 20,000.

3. The process according to claim 1 wherein the copolymer is present as 1 to 10 parts per million.

* * * * *